(12) United States Patent
Liu et al.

(10) Patent No.: US 11,109,414 B2
(45) Date of Patent: Aug. 31, 2021

(54) DATA TRANSMISSION METHOD, DEVICE AND SYSTEM, AND STORAGE MEDIUM

(71) Applicant: ZTE CORPORATION, Guangdong (CN)

(72) Inventors: Xu Liu, Guangdong (CN); Bo Dai, Guangdong (CN); Qian Dai, Guangdong (CN)

(73) Assignee: ZTE CORPORATION

( * ) Notice: Subject to any disclaimer, the term of this patent is extended or adjusted under 35 U.S.C. 154(b) by 15 days.

(21) Appl. No.: 16/477,911

(22) PCT Filed: Dec. 29, 2017

(86) PCT No.: PCT/CN2017/119897
§ 371 (c)(1),
(2) Date: Jan. 15, 2020

(87) PCT Pub. No.: WO2018/130094
PCT Pub. Date: Jul. 19, 2018

(65) Prior Publication Data
US 2020/0389921 A1    Dec. 10, 2020

(30) Foreign Application Priority Data
Jan. 13, 2017   (CN) .......................... 201710023994.2

(51) Int. Cl.
*H04W 76/27*   (2018.01)
*H04W 74/08*   (2009.01)
(Continued)

(52) U.S. Cl.
CPC ....... *H04W 74/0833* (2013.01); *H04W 28/10* (2013.01); *H04W 52/0251* (2013.01);
(Continued)

(58) Field of Classification Search
CPC ..... H04W 4/20; H04W 68/00; H04W 68/005; H04W 68/02; H04W 76/00;
(Continued)

(56) References Cited

U.S. PATENT DOCUMENTS

| 9,942,412 B1 * | 4/2018 | Oroskar ............ H04W 74/0833 |
| 2006/0153209 A1 * | 7/2006 | Venken ................. H04W 88/06 370/401 |

(Continued)

FOREIGN PATENT DOCUMENTS

| CN | 102264052 | 11/2011 |
| CN | 102333293 | 1/2012 |
| WO | 2016204985 | 12/2016 |

OTHER PUBLICATIONS

CATT. DL Small Data Transmission in Inactive State (R2-167955). 3GPP TSG-RAN WG2 Meeting #96; Reno, USA. Nov. 13, 2016.
(Continued)

*Primary Examiner* — Jean A Gelin
(74) *Attorney, Agent, or Firm* — McDonald Hopkins LLC

(57) ABSTRACT

Disclosed are a data transmission method, apparatus and system. A first paging message carries first indication information related to random access, so that a base station can complete identification of a terminal when the base station receives a preamble sent by the terminal, and downlink data to be transmitted may be carried in a second signaling flow. Meanwhile, second indication information indicating whether the transmission of the downlink data is completed may also be carried so that the terminal enters a radio resource control (RRC) suspension state. Finally, power consumption, a latency and resource overhead of the terminal are effectively reduced.

14 Claims, 4 Drawing Sheets

(51) Int. Cl.
   *H04W 28/10*   (2009.01)
   *H04W 52/02*   (2009.01)
   *H04W 68/00*   (2009.01)
   *H04W 72/04*   (2009.01)
(52) U.S. Cl.
   CPC ......... *H04W 68/005* (2013.01); *H04W 72/04* (2013.01); *H04W 76/27* (2018.02)
(58) Field of Classification Search
   CPC ........... H04W 74/008; H04W 74/0833; H04W 76/27; H04W 72/04; H04W 72/041; H04W 72/042; H04W 72/0453; H04W 28/10; H04W 52/051
   See application file for complete search history.

(56) References Cited

U.S. PATENT DOCUMENTS

| | | | | |
|---|---|---|---|---|
| 2013/0064151 | A1* | 3/2013 | Mujtaba | H04B 7/0871 370/311 |
| 2013/0080597 | A1* | 3/2013 | Liao | H04W 4/70 709/219 |
| 2014/0014026 | A1* | 1/2014 | McDonald | A61J 7/04 116/308 |
| 2014/0247780 | A1* | 9/2014 | Jafarian | H04W 72/0446 370/329 |
| 2014/0256318 | A1* | 9/2014 | Ekici | H04W 52/0235 455/435.1 |
| 2014/0307618 | A1* | 10/2014 | Kim | H04W 72/0406 370/312 |
| 2015/0003266 | A1* | 1/2015 | Guo | H04L 67/02 370/252 |
| 2016/0088611 | A1* | 3/2016 | Abraham | H04W 48/16 370/329 |
| 2016/0135247 | A1* | 5/2016 | Ozturk | H04W 36/0016 455/436 |
| 2017/0325164 | A1* | 11/2017 | Lee | H04W 76/28 |
| 2018/0091968 | A1* | 3/2018 | Ly | H04W 64/006 |
| 2018/0109976 | A1* | 4/2018 | Ly | H04W 74/0808 |
| 2018/0146450 | A1* | 5/2018 | Li | H04W 68/005 |
| 2018/0249441 | A1* | 8/2018 | Ryoo | H04L 5/00 |
| 2019/0239183 | A1* | 8/2019 | Du | H04W 68/02 |
| 2019/0274117 | A1* | 9/2019 | Zhang | H04W 74/00 |

OTHER PUBLICATIONS

Patent Cooperation Treaty (PCT), International Search Report and Written Opinion for Application PCT/CN2017/0119897 filed Dec. 18, 2017, dated Mar. 30, 2018, International Searching Authority, CN.

VIVO. Discussion on DL Data Transmission in RRC Inactive State (R2-1700040). 3GPP TSG-RAN WG2 NR Ad Hoc, Spokane, USA. Jan. 7, 2017.

"Support Data Transmission in Inactive State," CATT, 3GPP TSG RAN WG2 Meeting #95; R2-164807 (2016).

* cited by examiner

DATA TRANSMISSION METHOD, DEVICE AND SYSTEM, AND STORAGE MEDIUM

CROSS-REFERENCE TO RELATED APPLICATION

This application is a 35 U.S.C. 371 national stage filing of PCT Application No. PCT/CN2017/119897 filed on Dec. 29, 2017, which claims priority to Chinese Patent Application No. 201710023994.2, filed on Jan. 13, 2017, each of which are incorporated herein in their entireties by reference.

TECHNICAL FIELD

The present disclosure relates to radio communication technologies and, in particular, to a data transmission method, apparatus and system, and a storage medium.

BACKGROUND

The rapid development of mobile Internet, Internet of Things and other service applications has become the main driving force for the development of the 5th-Generation mobile communication technology (5G). It is urgently required that 5G has an access rate comparable to optical fibers, a capability of connecting 100 billion devices, perfect real-time experience, and a capability of radio broadband access anytime and anywhere. In addition, energy efficiency, spectral efficiency and peak rate and other important indicators also need to be considered comprehensively in the 5G system design. In future mobile network applications, the demand for traffic, the number of terminals and the types of terminals will all show an explosive growth trend. In the future, 5G has three major application scenarios: enhanced Mobile Broadband (eMBB), massive Machine Type Communication (mMTC) and Ultra Reliable & Low Latency Communication (uRLLC). As one of 5G's important scenarios and technologies, mMTC is receiving more and more attention.

Services of the mMTC terminal are not frequent, and most services are small data services. If a traditional data transmission method is used for only one small data service, the power consumption of the MMTC terminal is certainly influenced. Since the MMTC terminal is sensitive to power consumption, an effective method is required to reduce the power consumption of the MMTC. In addition, since the amount of data needed to be transmitted for one service is small, the time difference between the time for transmitting a certain small data and the time for establishing a flow is large, so that a long latency is brought, and the resource utilization rate is influenced at the same time. Therefore problems of a latency of the mMTC service and the resource utilization rate need to be considered at the same time.

SUMMARY

The main object of the present disclosure is to provide a data transmission method, apparatus and system, which can effectively reduce the power consumption, the latency and the resource overhead of a terminal during data transmission.

To achieve the above object, a data transmission method is provided in the present disclosure and includes steps described below.

A base station sends a first paging message carrying first indication information to a terminal, where the first indication information is used for indicating that the terminal determines a first signaling flow.

The base station receives the first signaling flow sent by the terminal, and identifies the terminal according to the first signaling flow.

The base station sends a second signaling flow to the terminal, where the second signaling flow carries downlink data.

In an embodiment, before the base station sends the first paging message carrying the first indication information to the terminal, the method includes a step described below.

The base station receives a second paging message sent by a core network.

The step in which the base station sends the first paging message carrying the first indication information to the terminal includes a step described below.

When the base station determines, according to the second paging message, that the terminal satisfies a preset condition, the base station sends the first paging message carrying the first indication information to the terminal.

A data transmission method is further provided in the present disclosure and includes steps described below.

A terminal receives a first paging message sent by a base station and carrying first indication information.

The terminal determines and sends a first signaling flow to the base station according to the first indication information, where the first signaling flow is used for indicating that the base station identifies the terminal.

The terminal receives a second signaling flow sent by the base station, where the second signaling flow carries downlink data.

A data transmission method is further provided in the present disclosure and includes steps described below.

A base station sends a first paging message carrying first indication information to a terminal.

The terminal receives the first paging message sent by the base station and carrying the first indication information.

The terminal determines and sends a first signaling flow to the base station according to the first indication information.

The base station receives the first signaling flow sent by the terminal, and identifies the terminal according to the first signaling flow.

The base station sends a second signaling flow to the terminal, where the second signaling flow carries downlink data.

The terminal receives the second signaling flow sent by the base station.

A data transmission apparatus is further provided in the present disclosure, is applied to a base station, and includes a first sending module, an identifying module and a second sending module.

The first sending module is configured to send a first paging message carrying first indication information to a terminal, where the first indication information is used for indicating that the terminal determines a first signaling flow.

The identifying module is configured to receive the first signaling flow sent by the terminal, and identify the terminal according to the first signaling flow.

The second sending module is configured to send a second signaling flow to the terminal, where the second signaling flow carries downlink data.

In an embodiment, the apparatus further includes a first receiving module and the first sending module.

The first receiving module is configured to receive a second paging message sent by a core network.

The first sending module is configured to: when the base station determines, according to the second paging message, that the terminal satisfies a preset condition, enable the base station to send the first paging message carrying the first indication information to the terminal.

In an embodiment, the first indication information includes at least one of: preamble index indication information or physical random access channel (PRACH) resource indication information bearing a preamble.

In an embodiment, the first sending module is configured to select a preamble and a PRACH resource and generate respective preamble index indication information and PRACH resource indication information; and is further configured to send the first paging message carrying the preamble index indication information and the PRACH resource indication information to the terminal.

In an embodiment, the identifying module is configured to receive, at a time-frequency position of the PRACH resource, a preamble sent by the terminal at the time-frequency position of the PRACH resource according to the preamble index indication information and the PRACH resource indication information; and is further configured to: when the base station detects that the received preamble is consistent with the selected preamble, identify the terminal.

In an embodiment, the second signaling flow further carries second indication information indicating that the transmission of the downlink data is completed.

In an embodiment, the apparatus further includes: a second receiving module, which is configured to receive a radio resource control (RRC) suspension response generated after the terminal enters an RRC suspension state according to the second indication information.

A data transmission apparatus is further provided in the present disclosure, is applied to a terminal, and includes a third receiving module, a determining module and a fourth receiving module.

The third receiving module is configured to receive a first paging message sent by a base station and carrying first indication information.

The determining module is configured to determine and send a first signaling flow to the base station according to the first indication information, where the first signaling flow is used for indicating that the base station identifies the terminal.

The fourth receiving module is configured to receive a second signaling flow sent by the base station, where the second signaling flow carries downlink data.

In an embodiment, the first indication information includes at least one of: preamble index indication information or PRACH resource indication information bearing a preamble.

In an embodiment, the third receiving module is configured to receive the first paging message sent by the base station and carrying the preamble index indication information and the PRACH resource indication information.

In an embodiment, the determining module is configured to determine a preamble according to the preamble index indication information, and determine, according to the PRACH resource indication information, a time-frequency position of a PRACH resource at which the preamble is sent; and is further configured to send the preamble to the base station at the time-frequency position of the PRACH resource.

In an embodiment, the second signaling flow further carries second indication information indicating that the transmission of the downlink data is completed.

In an embodiment, the apparatus further includes a third sending module.

The third sending module is configured to enable the terminal to enter an RRC suspension state according to the second indication information and send an RRC suspension response to the base station. A data transmission system is further provided in the present disclosure and includes a base station and a terminal.

The base station sends a first paging message carrying first indication information to the terminal.

The terminal receives the first paging message sent by the base station and carrying the first indication information.

The terminal determines and sends a first signaling flow to the base station according to the first indication information.

The base station receives the first signaling flow sent by the terminal, and identifies the terminal according to the first signaling flow.

The base station sends a second signaling flow to the terminal, where the second signaling flow carries downlink data.

The terminal receives the second signaling flow sent by the base station.

Through the method and apparatus described in the present disclosure, the first paging message carries the first indication information related to random access, so that the base station can complete the identification of the terminal when the base station receives the preamble sent by the terminal, and the downlink data to be transmitted can be carried in the second signaling flow. Meanwhile, the second indication information indicating whether the transmission of the downlink data is completed may also be carried so that the terminal enters the RRC suspension state. Finally, the power consumption, the latency and the resource overhead of the terminal are effectively reduced.

BRIEF DESCRIPTION OF DRAWINGS

To illustrate technical solutions in embodiments of the present disclosure more clearly, the drawings used in description of the embodiments or of the existing art will be briefly described below. Apparently, the drawings described below are merely part of the embodiments of the present disclosure, and those of ordinary skill in the art may acquire other drawings based on the drawings described below on the premise that no creative work is done.

DETAILED DESCRIPTION

Technical solutions in embodiments of the present disclosure will be described clearly and completely in conjunction with the drawings in the embodiments of the present disclosure. Apparently, the embodiments described below are part, not all of the embodiments of the present disclosure. Based on the embodiments of the present disclosure, all other embodiments acquired by those skilled in the art are within the scope of the present disclosure on the premise that no creative work is done.

The embodiments of the present disclosure may, but may not necessarily, be applied to the massive Machine Type Communication (mMTC) scenario. The network architecture in this scenario may include a network side device (e.g., a base station) and a terminal, and it is to be noted that an application scenario of the data transmission method provided in the embodiment of the present disclosure is not limited to the network architecture described above.

The network side device and the terminal may each include one or more processors (the processor may include, but is not limited to, a processing means such as a microcontroller unit (MCU) or a field programmable gate array (FPGA)), and a memory for storing data.

The memory may be configured to store software programs and modules of application software, such as program instructions/modules corresponding to the data transmission method in the embodiments of the present disclosure. The one or more processors execute the software programs and modules stored in the memory to perform functional applications and data processing, that is, to implement the method described above. The memory may include a high-speed random access memory, and may further include a nonvolatile memory, such as one or more magnetic storage apparatuses, flash memories or other nonvolatile solid-state memories.

In some examples, the memory may further include memories which are disposed remotely relative to the one or more processors and these remote memories may be connected to the network side device or the terminal via networks. Examples of the above network include, but are not limited to, the Internet, an intranet, a local area network, a mobile communication network and a combination thereof.

Embodiment 1

Figure 1:
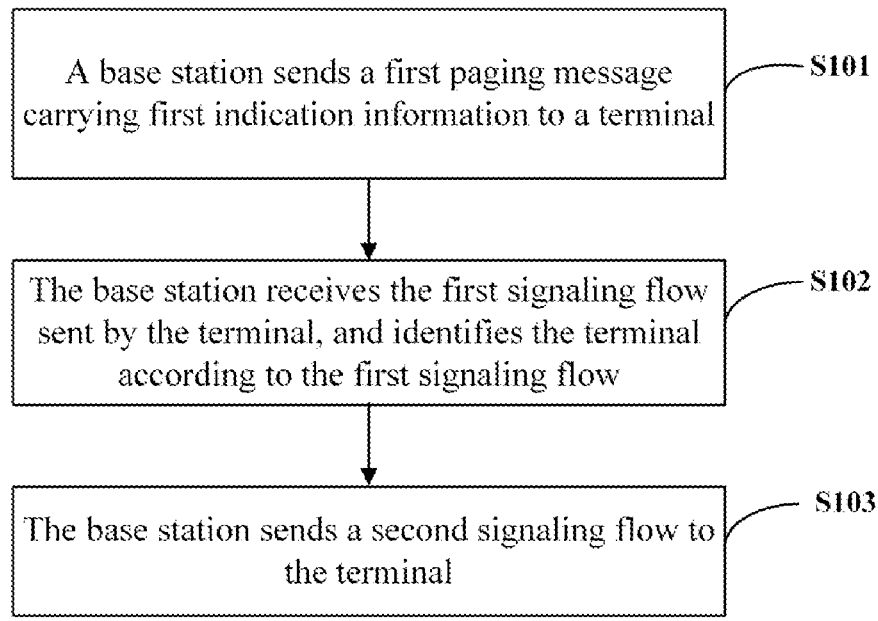
FIG. 1 is a flowchart of a data transmission method according to an embodiment 1 of the present disclosure.

FIG. 1 is a flowchart of a data transmission method according to the embodiment 1 of the present disclosure. The data transmission method is applied to a base station side. As shown in FIG. 1, the data transmission method includes steps described below.

In S101, a base station sends a first paging message carrying first indication information to a terminal, where the first indication information is used for indicating that the terminal determines a first signaling flow.

In S102, the base station receives the first signaling flow sent by the terminal, and identifies the terminal according to the first signaling flow.

In S103, the base station sends a second signaling flow to the terminal, where the second signaling flow carries downlink data.

According to the data transmission method described above, the first paging message carries the first indication information related to random access, so that the base station can complete the identification of the terminal when the base station receives the first signaling flow, and the downlink data to be transmitted may be carried in the second signaling flow. Therefore, the terminal latency and the resource overhead can be effectively reduced.

Figure 2:
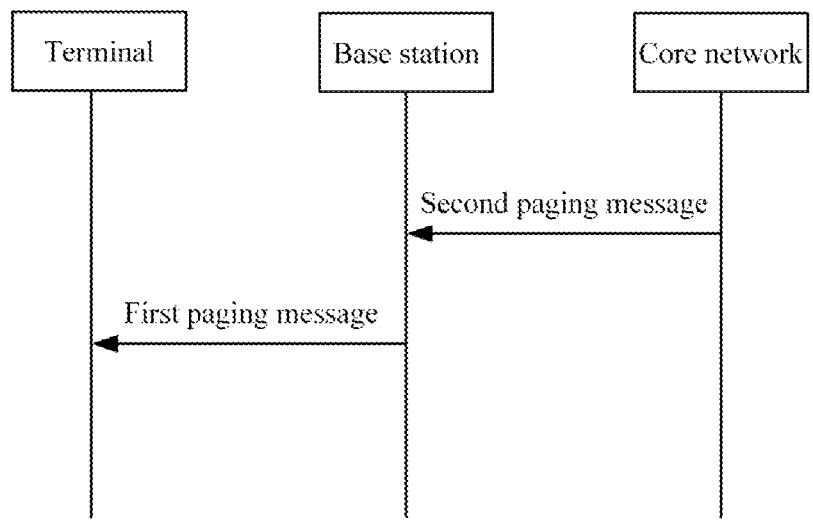
FIG. 2 is a data flow diagram according to the embodiment 1 of the present disclosure.

Implementation details of each step of the above method are as follows. It is to be noted that the method in the present embodiment is for a terminal in an idle state. In the present embodiment, if data is to be sent to a terminal in the idle state, the core network needs to send a second paging message to all base stations in a tracking area (TA) where the terminal is registered, and then the base station sends a first paging message to notify the terminal, as shown in FIG. 2. After receiving the first paging message, the terminal initiates an RRC connection so as to receive downlink data. The core network sends the second paging message, and then determines, according to the next execution action of the terminal, whether the downlink data to be transmitted in the current paging is successfully received by the terminal. If the downlink data to be transmitted in the current paging is not successfully received by the terminal, the core network continues to page the terminal in the next paging cycle.

Based on the above background, the specific and detailed analysis of the present embodiment is as follows.

Before the step S101, the base station receives the second paging message sent by the core network, where the second paging message is used for enabling the base station to determine whether the terminal satisfies a preset condition, and the terminal satisfying the preset condition includes at least one of: power consumption of the terminal satisfying preset power consumption, or a latency of the terminal satisfying a preset latency.

It is to be noted that in the present embodiment, the first signaling flow may be, for example, MESSAGE1 (MSG1) in the LTE system, and the second signaling flow may be, for example, MESSAGE2 (MSG2) in the LTE system.

In the step S101, the base station sends the first paging message carrying the first indication information to the terminal. The first indication information is used for indicating that the terminal determines the MSG1. The first indication information includes at least one of: preamble index indication information or PRACH resource indication information bearing a preamble. In the present embodiment, the first indication information includes preamble index indication information and PRACH resource indication information.

The base station firstly detects whether available non-contention preambles and PRACH resources exist in a paging cell (a cell in which the base station sends the first paging message). If available non-contention preambles and PRACH resources exist in the paging cell, the base station further determines whether a terminal to be paged by the base station satisfies a preset condition, for example, the base station determines whether the preamble index indication information and the PRACH resource indication information need to be carried according to whether the power consumption of the terminal satisfies the preset power consumption and whether the latency of the terminal satisfies the preset latency. If the power consumption of the terminal satisfies the preset power consumption, or the latency of the terminal satisfies the preset latency, or the power consumption of the terminal satisfies the preset power consumption and the latency of the terminal satisfies the preset latency, the base station needs to carry the preamble index indication information and the PRACH resource indication information in the first paging message. Of course, if the base station determines that neither of the above two conditions is met, the base station continues to perform determination, and the base station does not determine that the preamble index indication information and the PRACH resource indication information need to be carried in the first paging message until one of the two conditions is satisfied or the two conditions are met at the same time.

After it is determined that the base station needs to carry the preamble index indication information and the PRACH resource indication information in the first paging message, the base station selects one available preamble from dedicated preambles for non-contention random access, and generates corresponding preamble index indication information. The base station also selects an available PRACH resource from PRACH resources for non-contention random access, and generates corresponding PRACH resource indication information. Then, when the base station sends the first paging message, the first paging message carries preamble index indication information and PRACH resource indication information bearing the preamble.

It is to be noted that the first paging message may also carry only the preamble index indication information or only the PRACH resource indication information. In these cases, the terminal receiving the preamble index indication information may indirectly acquire the corresponding PRACH resource indication information; or the terminal receiving the PRACH resource indication information may indirectly acquire the corresponding preamble index indication information, but such indirect acquisition is unstable and may cause errors, which results in that the base station cannot identify the terminal, and at this time, the indirect acquisition fails, and the process of indirect acquisition needs to be performed again until the indirect acquisition succeeds. It is further to be noted that in the present embodiment, the preamble index indication information and the PRACH resource indication information are selected to be carried in the first paging message at the same time.

In addition, the first paging information may further carry a Cell-Radio Network Temporary Identifier (C-RNTI for short) allocated to the terminal.

After the base station sends the first paging message carrying the preamble index indication information and the PRACH resource indication information to the terminal, the terminal determines a preamble to be sent to the base station according to the preamble index indication information, and meanwhile determines, according to the PRACH resource indication information, a time-frequency position of the PRACH resource at which the preamble is sent.

In the step S102, the base station receives the MSG1 sent by the terminal, and identifies the terminal according to the MSG1, where the MSG 1 carries a preamble. The terminal sends the preamble to the base station at the time-frequency position of the PRACH resource, and accordingly, the base station receives the preamble sent by the terminal at the time-frequency position of the PRACH resource. It is to be noted that the identification of the terminal is completed when the base station detects the preamble sent by the terminal and confirms that the preamble is consistent with the dedicated preamble previously selected by the base station for non-contention random access.

In the step S103, the base station sends a second signaling flow MSG2 to the terminal, where the MSG2 carries downlink data. In the present embodiment, since the terminal is already identified before the base station sends the MSG2, downlink data may be carried in the MSG2. It is to be noted that the MSG2 may further carry second indication information for indicating that transmission of the downlink data carried in the MSG2 is completed. Accordingly, in the case where the MSG2 carries the second indication information, after the step S103, the method includes that the terminal enters an RRC connection suspension process (that is, the terminal is converted to be in an RRC suspension state) according to the second indication information. Then, the terminal sends an RRC suspension response to the base station, and accordingly, the base station receives the RRC suspension response.

In the RRC connection suspension process, the terminal may implicitly feed back whether the data carried in the MSG2 is received successfully, that is, when the base station receives the RRC suspension response, the base station is implicitly notified of whether the terminal has successfully received the downlink data carried in the MSG2. The implicit notification refers to that reception of the RRC suspension response by the base station means successful reception of the downlink data by the terminal, but this is not in one-to-one correspondence, and in some cases, reception of the RRC suspension response by the base station cannot indicate successful reception of the downlink data by the terminal. For example, errors occur in the data interaction between the base station and the terminal. In the RRC connection suspension process, the terminal may also explicitly feed back whether the data carried in the MSG2 is received successfully, for example, the base station may be notified of whether the data carried in the MSG2 is received successfully by adding the third indication information indicating whether the data is received successfully in the RRC suspension response. Of course, this function may also be implemented in the RRC connection suspension process, that is, the terminal separately sends a message of successful reception to the base station, but this function may not be necessarily implemented in this process, and may also be implemented in the subsequent process after the MSG2.

According to the data transmission method described above, the first paging message carries the first indication information related to random access, so that the base station can complete the identification of the terminal when the base station receives the preamble sent by the terminal, and the downlink data to be transmitted may be carried in the MSG2. The resource overhead can be effectively reduced. Meanwhile, the second indication information indicating whether the transmission of the downlink data is completed may also be carried so as to enable the terminal to enter the RRC suspension state, and the purpose of the node can be effectively achieved. Finally, through the present embodiment, the power consumption, the latency and the resource overhead of the terminal are effectively reduced.

Embodiment 2

Figure 3:
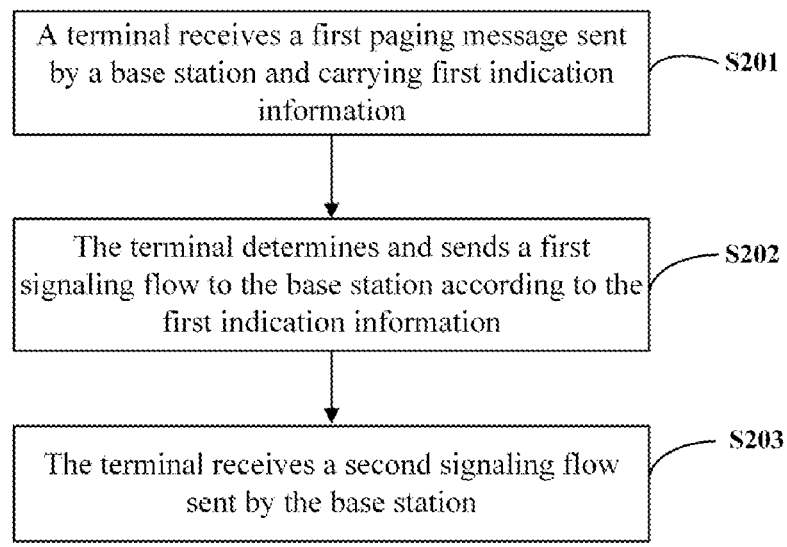
FIG. 3 is a flowchart of a data transmission method according to an embodiment 2 of the present disclosure.

FIG. 3 is a flowchart of a data transmission method according to the embodiment 2 of the present disclosure. The data transmission method is applied to a terminal side. As shown in FIG. 3, the data transmission method includes steps described below.

In step S201, a terminal receives a first paging message sent by a base station and carrying first indication information.

In step S202, the terminal determines and sends a first signaling flow to the base station according to the first indication information, where the first signaling flow is used for indicating that the base station identifies the terminal.

In step S203, the terminal receives a second signaling flow sent by the base station, where the second signaling flow carries downlink data.

According to the data transmission method described above, the first paging message carries the first indication information related to random access, so that the base station can complete the identification of the terminal when the base station receives the first signaling flow, and the downlink data to be transmitted may be carried in the second signaling flow. Therefore, the terminal latency and the resource overhead can be effectively reduced.

It is to be noted that in the present embodiment, the first signaling flow may be, for example, MSG1 in the LTE system, and the second signaling flow may be, for example, MSG2 in the LTE system.

Implementation details of each step of the above method are as follows.

Before the step S201, it is further required to determine whether the terminal satisfies a preset condition. Specifically, firstly, the base station receives the second paging message sent by the core network, where the second paging message is used for enabling the base station to determine whether the terminal satisfies the preset condition, and the terminal satisfying the preset condition includes at least one of: power consumption of the terminal satisfying preset power consumption, or a latency of the terminal satisfying a preset latency. Then, if the base station determines that the terminal satisfies the sending condition, the base station sends the first paging message carrying the first indication information to the terminal, and simultaneously, the step S201 is performed.

In the step S201, the terminal receives the first paging message sent by a base station and carrying the first indication information. The first indication information includes at least one of: preamble index indication information or PRACH resource indication information bearing a preamble. In the present embodiment, the terminal receives the first paging message sent by the base station and carrying the preamble index indication information and the PRACH resource indication information, that is, the first paging message includes both the preamble index indication information and the PRACH resource indication information.

In the step S202, the terminal determines and sends the MSG1 to the base station according to the first indication information, where the MSG1 is used for indicating that the base station identifies the terminal. Firstly, the terminal determines a preamble according to the preamble index indication information, and determines, according to the PRACH resource indication information, a time-frequency position of a PRACH resource at which the preamble is sent. Then, the terminal sends the preamble to the base station at the time-frequency position of the PRACH resource. Here, the reason why the base station can identify the terminal is that the MSG1 carries a corresponding preamble, and if the preamble is consistent with the preamble selected by the base station, the base station identifies the terminal (the content of selection of the preamble by the base station is described in detail in the embodiment 1, and is not described herein).

In the step S203, the terminal receives the MSG2 sent by the base station, where the MSG2 carries downlink data. In the present embodiment, since the terminal is already identified before the base station sends the MSG2, downlink data may be carried in the MSG2.

It is to be noted that the MSG2 further carries second indication information indicating that the transmission of the downlink data is completed. When the MSG2 carries the second indication information, after the step S203, the method further includes: the terminal enters an RRC suspension state according to the second indication information; and that the terminal sends an RRC suspension response to the base station.

It is further to be noted that in the RRC connection suspension process, the terminal may implicitly feed back whether the data carried in the MSG2 is received successfully, that is, when the base station receives the RRC suspension response, the base station is implicitly notified of whether the terminal has successfully received the downlink data carried in the MSG2. In the RRC connection suspension process, the terminal may also explicitly feed back whether the data carried in the MSG2 is received successfully, for example, the base station may be notified of whether the data carried in the MSG2 is received successfully by adding the third indication information indicating whether the data is received successfully in the RRC suspension response. Of course, this function may also be implemented in the RRC connection suspension process, that is, the terminal separately sends a message of successful reception to the base station, but this function may not be necessarily implemented in this process, and may also be implemented in the subsequent process after the MSG2.

According to the data transmission method described above, the first paging message carries the first indication information related to random access, so that the base station can complete the identification of the terminal when the base station receives the preamble sent by the terminal, and the downlink data to be transmitted may be carried in the MSG2.

Meanwhile, the second indication information indicating whether the transmission of the downlink data is completed may also be carried so that the terminal enters the RRC suspension state.

Finally, the power consumption, the latency and the resource overhead of the terminal are effectively reduced.

Embodiment 3

Figure 4:
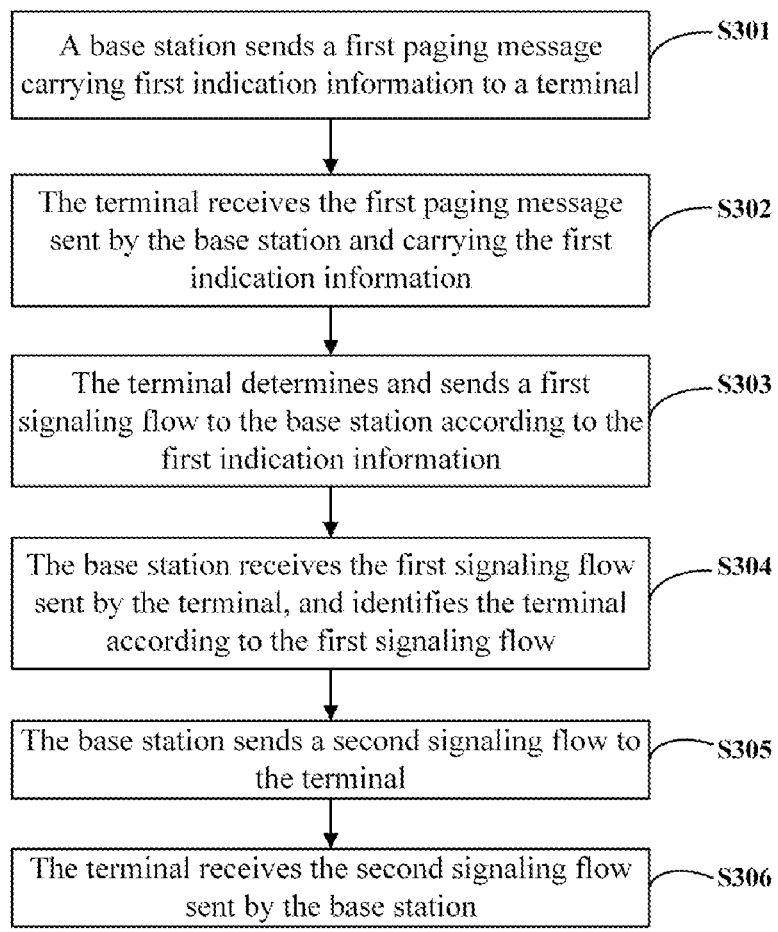
FIG. 4 is a flowchart of a data transmission method according to an embodiment 3 of the present disclosure.

FIG. 4 is a flowchart of a data transmission method according to the embodiment 3 of the present disclosure. The data transmission method is applied to a base station side and a terminal side. As shown in FIG. 4, the data transmission method includes steps described below.

In step S301, a base station sends a first paging message carrying first indication information to a terminal.

In step S302, the terminal receives the first paging message sent by the base station and carrying the first indication information.

In step S303, the terminal determines and sends a first signaling flow to the base station according to the first indication information.

In step S304, the base station receives the first signaling flow sent by the terminal, and identifies the terminal according to the first signaling flow.

In step S305, the base station sends a second signaling flow to the terminal, where the second signaling flow carries downlink data.

In step S306, the terminal receives the second signaling flow sent by the base station.

According to the data transmission method described above, the first paging message carries the first indication information related to random access, so that the base station can complete the identification of the terminal when the base station receives the first signaling flow, and the downlink data to be transmitted may be carried in the second signaling flow. Therefore, the terminal latency and the resource overhead can be effectively reduced.

It is to be noted that in the present embodiment, the first signaling flow may be, for example, MSG1 in the LTE system, and the second signaling flow may be, for example, MSG2 in the LTE system.

Before the step S301, the base station receives the second paging message sent by the core network, where the second paging message is used for enabling the base station to determine whether the terminal satisfies a preset condition, and the terminal satisfying the preset condition includes at least one of: power consumption of the terminal satisfying preset power consumption, or a latency of the terminal satisfying a preset latency.

In the steps S301 and S302, the first indication information includes at least one of: preamble index indication information or PRACH resource indication information bearing a preamble. In the present embodiment, the first indication information includes preamble index indication information and PRACH resource indication information.

The base station firstly detects whether available non-contention preambles and PRACH resources exist in a paging cell (a cell in which the base station sends the first paging message). If available non-contention preambles and PRACH resources exist in the paging cell, the base station further determines whether a terminal to be paged by the base station satisfies a preset condition, for example, the base station determines whether the preamble index indication information and the PRACH resource indication information need to be carried according to whether the power consumption of the terminal satisfies the preset power consumption and whether the latency of the terminal satisfies the preset latency.

After it is determined that the base station needs to carry the preamble index indication information and the PRACH resource indication information in the first paging message, the base station selects one available preamble from dedicated preambles for non-contention random access, and generates corresponding preamble index indication information. The base station also selects an available PRACH resource from PRACH resources for non-contention random access, and generates corresponding PRACH resource indication information. Then, when the base station sends the first paging message, the first paging message carries preamble index indication information and PRACH resource indication information bearing the preamble.

After the base station sends the first paging message carrying the preamble index indication information and the PRACH resource indication information to the terminal, the terminal determines a preamble to be sent to the base station according to the preamble index indication information, and meanwhile determines, according to the PRACH resource indication information, a time-frequency position of the PRACH resource at which the preamble is sent.

In the steps S303 and S304, the terminal sends the preamble to the base station at the time-frequency position of the PRACH resource, and accordingly, the base station receives the preamble sent by the terminal at the time-frequency position of the PRACH resource. It is to be noted that the identification of the terminal is completed when the base station detects the preamble sent by the terminal and confirms that the preamble is consistent with the dedicated preamble previously selected by the base station for non-contention random access.

In the steps S305 and S306, the base station sends the second signaling flow to the terminal, where the MSG2 carries downlink data; and the terminal receives the MSG2 sent by the base station. In the present embodiment, since the terminal is already identified before the base station sends the MSG2, downlink data may be carried in the MSG2. It is to be noted that the MSG2 may further carry second indication information for indicating that transmission of the downlink data carried in the MSG2 is completed. Accordingly, in the case where the MSG2 carries the second indication information, after the step S306, the method includes that the terminal enters an RRC connection suspension process (that is, the terminal is converted to be in an RRC suspension state) according to the second indication information. Then, the terminal sends an RRC suspension response to the base station, and accordingly, the base station receives the RRC suspension response.

It is further to be noted that in the RRC connection suspension process, the terminal may implicitly feed back whether the data carried in the MSG2 is received successfully, that is, when the base station receives the RRC suspension response, the base station is implicitly notified of whether the terminal has successfully received the downlink data carried in the MSG2. In the RRC connection suspension process, the terminal may also explicitly feed back whether the data carried in the MSG2 is received successfully, for example, the base station may be notified of whether the data carried in the MSG2 is received successfully by adding the third indication information indicating whether the data is received successfully in the RRC suspension response. Of course, this function may also be implemented in the RRC connection suspension process, that is, the terminal separately sends a message of successful reception to the base station, but this function may not be necessarily implemented in this process, and may also be implemented in the subsequent process after the MSG2.

According to the data transmission method described above, the first paging message carries the first indication information related to random access, so that the base station can complete the identification of the terminal when the base station receives the preamble sent by the terminal, and the downlink data to be transmitted may be carried in the MSG2. Meanwhile, the second indication information indicating whether the transmission of the downlink data is completed may also be carried so that the terminal enters the RRC suspension state. Finally, the power consumption, the latency and the resource overhead of the terminal are effectively reduced.

Embodiment 4

Figure 5:
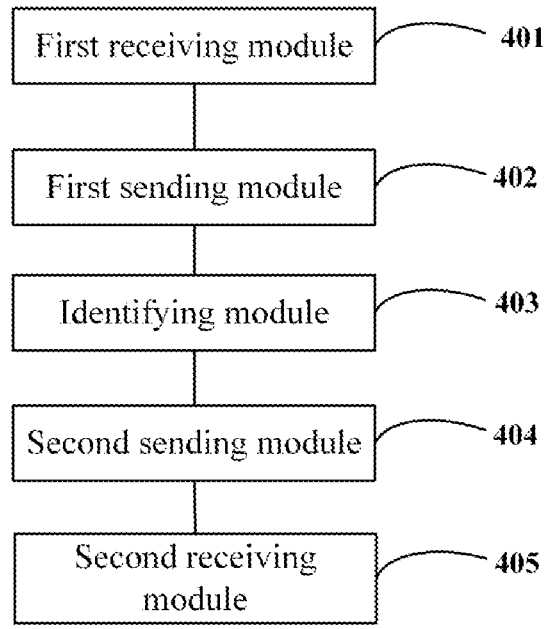
FIG. 5 is a structural diagram of a data transmission apparatus according to an embodiment 4 of the present disclosure.

FIG. 5 is a structural diagram of a data transmission apparatus according to the embodiment 4 of the present disclosure. The data transmission is as shown in FIG. 4. The data transmission apparatus includes: a first receiving module 401 and a first sending module 402.

The first receiving module 401 is configured to receive a second paging message sent by a core network.

The first sending module 402 is configured to send a first paging message carrying first indication information to a terminal, where the first indication information is used for indicating that the terminal determines a first signaling flow. The first sending module 402 is configured to: when the base station determines, according to the second paging message, that the terminal satisfies a preset condition, enable the base station to send the first paging message carrying the first indication information to the terminal. The terminal satisfying the preset condition includes at least one of: power consumption of the terminal satisfying preset power consumption, or a latency of the terminal satisfying a preset latency. The first indication information includes at least one of: preamble index indication information or PRACH resource indication information bearing a preamble. The first sending module 402 is configured to select a preamble and a PRACH resource and generate respective preamble index indication information and PRACH resource indication information; and is further configured to send the first paging message carrying the preamble index indication information and the PRACH resource indication information to the terminal.

The identifying module 403 is configured to receive the first signaling flow sent by the terminal, and identify the terminal according to the first signaling flow. The identifying module 403 is configured to receive, at a time-frequency position of the PRACH resource, a preamble sent by the terminal at the time-frequency position of the PRACH resource according to the preamble index indication information and the PRACH resource indication information; and is further configured to: when the base station detects that the received preamble is consistent with the selected preamble, identify the terminal.

The second sending module 404 is configured to send a second signaling flow to the terminal, where the second signaling flow carries downlink data. The second signaling flow further carries second indication information indicating that the transmission of the downlink data is completed.

The second receiving module 405 is configured to receive an RRC suspension response generated after the terminal enters an RRC suspension state according to the second indication information.

It is to be noted that in the present embodiment, the first signaling flow may be, for example, MSG1 in the LTE system, and the second signaling flow may be, for example, MSG2 in the LTE system.

Embodiment 5

Figure 6:
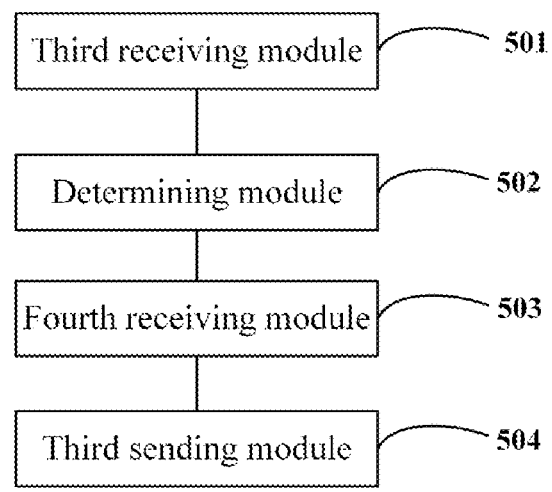
FIG. 6 is a structural diagram of a data transmission apparatus according to an embodiment 5 of the present disclosure.

FIG. 6 is a structural diagram of a data transmission apparatus according to the embodiment 5 of the present disclosure. The data transmission is as shown in FIG. 4. The data transmission apparatus includes: a third receiving module 501, a determining module 502, a fourth receiving module 503 and a third sending module 504.

The third receiving module 501 is configured to receive a first paging message sent by a base station and carrying first indication information. The first indication information includes at least one of: preamble index indication information or PRACH resource indication information bearing a preamble. The third receiving module is configured to receive the first paging message sent by the base station and carrying the preamble index indication information and the PRACH resource indication information.

The determining module 502 is configured to determine and send a first signaling flow to the base station according to the first indication information, where the first signaling flow is used for indicating that the base station identifies the terminal. The determining module is configured to determine a preamble according to the preamble index indication information, and determine, according to the PRACH resource indication information, a time-frequency position of a PRACH resource at which the preamble is sent; and is further configured to send the preamble to the base station at the time-frequency position of the PRACH resource.

The fourth receiving module 503 is configured to receive a second signaling flow sent by the base station, where the second signaling flow carries downlink data. The second signaling flow further carries second indication information indicating that the transmission of the downlink data is completed.

The third sending module 504 is configured to enable the terminal to enter an RRC suspension state according to the second indication information and send an RRC suspension response to the base station.

It is to be noted that in the present embodiment, the first signaling flow may be, for example, MSG1 in the LTE system, and the second signaling flow may be, for example, MSG2 in the LTE system.

Embodiment 6

A data transmission system is provided in the present embodiment and includes a base station and a terminal.

The base station sends a first paging message carrying first indication information to the terminal; and correspondingly, the terminal receives the first paging message sent by the base station and carrying the first indication information.

The terminal determines and sends a first signaling flow to the base station according to the first indication information; and correspondingly, the base station receives the first signaling flow sent by the terminal, and identifies the terminal according to the first signaling flow.

The base station sends a second signaling flow to the terminal, where the second signaling flow carries downlink data; and correspondingly, the terminal receives the second signaling flow sent by the base station.

It is to be noted that in the present embodiment, the first signaling flow may be, for example, MSG1 in the LTE system, and the second signaling flow may be, for example, MSG2 in the LTE system.

The base station and the terminal in the present embodiment may be described in detail as follows.

The base station receives the second paging message sent by the core network, where the second paging message is used for enabling the base station to determine whether the terminal satisfies a preset condition, and the terminal satisfying the preset condition includes at least one of: power consumption of the terminal satisfying preset power consumption, or a latency of the terminal satisfying a preset latency. The first indication information includes at least one of: preamble index indication information or PRACH resource indication information bearing a preamble. In the present embodiment, the first indication information includes preamble index indication information and PRACH resource indication information.

The base station firstly detects whether available non-contention preambles and PRACH resources exist in a paging cell (a cell in which the base station sends the first paging message). If available non-contention preambles and PRACH resources exist in the paging cell, the base station further determines whether a terminal to be paged by the base station satisfies a preset condition, for example, the base station determines whether the preamble index indication information and the PRACH resource indication information need to be carried according to whether the power consumption of the terminal satisfies the preset power consumption and whether the latency of the terminal satisfies the preset latency.

After it is determined that the base station needs to carry the preamble index indication information and the PRACH resource indication information in the first paging message, the base station selects one available preamble from dedicated preambles for non-contention random access, and generates corresponding preamble index indication information. The base station also selects an available PRACH resource from PRACH resources for non-contention random access, and generates corresponding PRACH resource indication information. Then, when the base station sends the first paging message, the first paging message carries preamble index indication information and PRACH resource indication information bearing the preamble.

After the base station sends the first paging message carrying the preamble index indication information and the PRACH resource indication information to the terminal, the terminal determines a preamble to be sent to the base station according to the preamble index indication information, and meanwhile determines, according to the PRACH resource indication information, a time-frequency position of the PRACH resource at which the preamble is sent.

The terminal sends the preamble to the base station at the time-frequency position of the PRACH resource, and accordingly, the base station receives the preamble sent by the terminal at the time-frequency position of the PRACH resource. It is to be noted that the identification of the terminal is completed when the base station detects the preamble sent by the terminal and confirms that the preamble is consistent with the dedicated preamble previously selected by the base station for non-contention random access.

The base station sends the second signaling flow to the terminal, where the MSG2 carries downlink data; and the terminal receives the MSG2 sent by the base station. In the present embodiment, since the terminal is already identified before the base station sends the MSG2, downlink data may be carried in the MSG2. It is to be noted that the MSG2 may further carry second indication information for indicating that transmission of the downlink data carried in the MSG2 is completed. Accordingly, in the case where the MSG2 carries the second indication information, the terminal enters an RRC connection suspension process (that is, the terminal is converted to be in an RRC suspension state) according to the second indication information. Then, the terminal sends an RRC suspension response to the base station, and accordingly, the base station receives the RRC suspension response.

It is further to be noted that in the RRC connection suspension process, the terminal may implicitly feed back whether the data carried in the MSG2 is received successfully, that is, when the base station receives the RRC suspension response, the base station is implicitly notified of whether the terminal has successfully received the downlink data carried in the MSG2. In the RRC connection suspension process, the terminal may also explicitly feed back whether the data carried in the MSG2 is received successfully, for example, the base station may be notified of whether the data carried in the MSG2 is received successfully by adding the third indication information indicating whether the data is received successfully in the RRC suspension response. Of course, this function may also be implemented in the RRC connection suspension process, that is, the terminal separately sends a message of successful reception to the base station, but this function may not be necessarily implemented in this process, and may also be implemented in the subsequent process after the MSG2.

Embodiment 7

A storage medium is provided in the present embodiment. Optionally, in the present embodiment, the storage medium may be configured to store program codes for performing steps described below.

In S101, a base station sends a first paging message carrying first indication information to a terminal, where the first indication information is used for indicating that the terminal determines a first signaling flow.

In S102, the base station receives the first signaling flow sent by the terminal, and identifies the terminal according to the first signaling flow.

In S103, the base station sends a second signaling flow to the terminal, where the second signaling flow carries downlink data.

Optionally, in the present embodiment, the storage medium may include, but is not limited to, a USB flash disk, a read-only memory (ROM), a random access memory (RAM), a mobile hard disk, a magnetic disk, an optical disk or another medium capable of storing program codes.

Optionally, in the present embodiment, a processor performs the steps of the method in the embodiment described above according to the program codes stored in the storage medium.

Optionally, for specific examples in the present embodiment, reference may be made to the examples described in the above-mentioned embodiment 1 and optional embodiments, and repetition will not be made in the present embodiment.

Embodiment 8

A storage medium is provided in the present embodiment. Optionally, in the present embodiment, the storage medium may be configured to store program codes for performing steps described below.

In step S201, a terminal receives a first paging message sent by a base station and carrying first indication information.

In step S202, the terminal determines and sends a first signaling flow to the base station according to the first indication information, where the first signaling flow is used for indicating that the base station identifies the terminal.

In step S203, the terminal receives a second signaling flow sent by the base station, where the second signaling flow carries downlink data.

Optionally, in the present embodiment, the storage medium may include, but is not limited to, a USB flash disk, a ROM, a RAM, a mobile hard disk, a magnetic disk, an optical disk or another medium capable of storing program codes.

Optionally, in the present embodiment, a processor performs the steps of the method in the embodiment described above according to the program codes stored in the storage medium.

Optionally, for specific examples in the present embodiment, reference may be made to the examples described in the above-mentioned embodiment 2 and optional embodiments, and repetition will not be made in the present embodiment.

Embodiment 9

A storage medium is provided in the present embodiment. Optionally, in the present embodiment, the storage medium may be configured to store program codes for performing steps described below.

In step S301, a base station sends a first paging message carrying first indication information to a terminal.

In step S302, the terminal receives the first paging message sent by the base station and carrying the first indication information.

In step S303, the terminal determines and sends a first signaling flow to the base station according to the first indication information.

In step S304, the base station receives the first signaling flow sent by the terminal, and identifies the terminal according to the first signaling flow.

In step S305, the base station sends a second signaling flow to the terminal, where the second signaling flow carries downlink data.

In step S306, the terminal receives the second signaling flow sent by the base station.

Optionally, in the present embodiment, the storage medium may include, but is not limited to, a USB flash disk, a ROM, a RAM, a mobile hard disk, a magnetic disk, an optical disk or another medium capable of storing program codes.

Optionally, in the present embodiment, a processor performs the steps of the method in the embodiment described above according to the program codes stored in the storage medium.

Optionally, for specific examples in the present embodiment, reference may be made to the examples described in the above-mentioned embodiment 3 and optional embodiments, and repetition will not be made in the present embodiment.

Apparently, it should be understood by those skilled in the art that each of the above-mentioned modules or steps of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

Although the embodiments disclosed by the present disclosure are as described above, the content thereof is merely embodiments for facilitating the understanding of the present disclosure and is not intended to limit the present disclosure. Those skilled in the art to which the present disclosure pertains may make any modifications and changes in the form and detail of the implementation without departing from the spirit and range disclosed by the present disclosure, but the patent protection scope of the present disclosure is still subject to the scope defined by the appended claims.

The invention claimed is:

1. A data transmission method, comprising:
   sending, by a base station, a first paging message carrying first indication information to a terminal, wherein the first indication information is used for indicating that the terminal determines a first signaling flow;
   receiving, by the base station, the first signaling flow sent by the terminal, and identifying the terminal according to the first signaling flow; and
   sending, by the base station, a second signaling flow to the terminal, wherein the second signaling flow carries downlink data;
   wherein the first indication information comprises at least one of:
   preamble index indication information; or
   physical random access channel (PRACH) resource indication information bearing a preamble;
   wherein sending, by the base station, the first paging message carrying the first indication information to the terminal comprises:
   selecting, by the base station, a preamble and a PRACH resource, and generating the preamble index indication information corresponding to the preamble and the PRACH resource indication information corresponding to the PRACH resource; and sending, by the base station, the first paging message carrying the preamble index indication information and the PRACH resource indication information to the terminal; and
   wherein receiving, by the base station, the first signaling flow sent by the terminal comprises:
   receiving, by the base station and at a time-frequency position of the PRACH resource, a preamble sent by the terminal and at the time-frequency position of the PRACH resource according to the preamble index indication information and the PRACH resource indication information.

2. The data transmission method of claim 1,
   wherein before sending, by the base station, the first paging message carrying the first indication information to the terminal, the method comprises: receiving, by the base station, a second paging message sent by a core network;
   wherein sending, by the base station, the first paging message carrying the first indication information to the terminal comprises: in response to determining that the base station determines, according to the second paging message, that the terminal satisfies a preset condition, sending, by the base station, the first paging message carrying the first indication information to the terminal.

3. The data transmission method of claim 2, wherein the terminal satisfying the preset condition comprises at least one of:
   power consumption of the terminal satisfying preset power consumption, or
   a latency of the terminal satisfying a preset latency.

4. The data transmission method of claim 1, wherein identifying, by the base station, the terminal according to the first signaling flow comprises:
   in response to determining that the base station detects that the received preamble is consistent with the selected preamble, identifying, by the base station, the terminal.

5. The data transmission method of claim 1, wherein the second signaling flow further carries second indication information indicating that a transmission of the downlink data is completed.

6. The data transmission method of claim 5, wherein after sending, by the base station, the second signaling flow to the terminal, the method further comprises:
   receiving, by the base station, a radio resource control (RRC) suspension response that is generated by the terminal after the terminal enters an RRC suspension state according to the second indication information.

7. A non-transitory storage medium, which is configured to store program codes for preforming the method of claim 1.

8. A data transmission method, comprising:
   receiving, by a terminal, a first paging message sent by a base station and carrying first indication information;
   determining and sending, by the terminal, a first signaling flow to the base station according to the first indication information, wherein the first signaling flow is used for indicating that the base station identifies the terminal; and
   receiving, by the terminal, a second signaling flow sent by the base station, wherein the second signaling flow carries downlink data;
   wherein the first indication information comprises at least one of:
   preamble index indication information, or physical random access channel (PRACH) resource indication information bearing a preamble;

wherein receiving, by the terminal, the first paging message sent by the base station and carrying the first indication information comprises:

receiving, by the terminal, the first paging message sent by the base station and carrying the preamble index indication information and the PRACH resource indication information; and wherein determining and sending, by the terminal, the first signaling flow to the base station according to the first indication information comprises:

determining, by the terminal, a preamble according to the preamble index indication information, and determining, according to the PRACH resource indication information, a time-frequency position of a PRACH resource at which the preamble is sent and sending, by the terminal, the preamble to the base station at the time-frequency position of the PRACH resource.

9. The data transmission method of claim 8, wherein the second signaling flow further carries second indication information indicating that a transmission of the downlink data is completed.

10. The data transmission method of claim 9, wherein after receiving, by the terminal, the second signaling flow sent by the base station, the method further comprises:

the terminal entering a radio resource control (RRC) suspension state according to the second indication information; and sending, by the terminal, an RRC suspension response to the base station.

11. A data transmission apparatus, applied to a terminal and comprising a processor and a memory for storing executable instructions, wherein the processor is configured to, when executing the executable instructions, perform the method of claim 8.

12. A non-transitory storage medium, which is configured to store program codes for preforming the method of claim 8.

13. A data transmission apparatus, applied to a base station and comprising a processor and a memory for storing executable instructions that when executed by the processor cause the processor to perform the steps in following modules:

a first sending module, which is configured to send a first paging message carrying first indication information to a terminal, wherein the first indication information is used for indicating that the terminal determines a first signaling flow;

an identifying module, which is configured to receive the first signaling flow sent by the terminal, and identify the terminal according to the first signaling flow; and a second sending module, which is configured to send a second signaling flow to the terminal, wherein the second signaling flow carries downlink data;

wherein the first indication information comprises at least one of:

preamble index indication information; or physical random access channel (PRACH) resource indication information bearing a preamble;

wherein the first sending module is configured to select a preamble and a PRACH resource and generate the preamble index indication information corresponding to the preamble and the PRACH resource indication information corresponding to the PRACH resource; and the first sending module is further configured to send the first paging message carrying the preamble index indication information and the PRACH resource indication information to the terminal; and wherein the identifying module is configured to receive, at a time-frequency position of the PRACH resource, a preamble sent by the terminal at the time-frequency position of the PRACH resource according to the preamble index indication information and the PRACH resource indication information.

14. The data transmission apparatus of claim 13, further comprising:

a first receiving module, which is configured to receive a second paging message sent by a core network; and the first sending module, which is configured to: in response to determining that the base station determines, according to the second paging message, that the terminal satisfies a preset condition, send the first paging message carrying the first indication information to the terminal.

* * * * *

UNITED STATES PATENT AND TRADEMARK OFFICE
CERTIFICATE OF CORRECTION

PATENT NO. : 11,109,414 B2  
APPLICATION NO. : 16/477911  
DATED : August 31, 2021  
INVENTOR(S) : Liu et al.

Page 1 of 1

It is certified that error appears in the above-identified patent and that said Letters Patent is hereby corrected as shown below:

On the Title Page

Column 1, item (73), The assignee should be corrected to:  
XI'AN ZHONGXING NEW SOFTWARE CO., LTD  
Xi'an Shaanxi (CN)

Signed and Sealed this  
Twenty-fourth Day of September, 2024

Katherine Kelly Vidal  
*Director of the United States Patent and Trademark Office*